United States Patent [19]

Pacosz

[11] Patent Number: 4,990,313
[45] Date of Patent: Feb. 5, 1991

[54] ULTRAVIOLET DEVICE

[75] Inventor: Richard W. Pacosz, Myrtle Beach, S.C.

[73] Assignee: American Ultra Air, Inc., Myrtle Beach, S.C.

[21] Appl. No.: 464,438

[22] Filed: Jan. 12, 1990

[51] Int. Cl.⁵ .............................................. A62B 7/08
[52] U.S. Cl. .................................... 422/121; 55/267; 55/279; 55/467; 62/78; 62/264
[58] Field of Search ............... 55/267, 268, 269, 279, 55/467, 473; 422/121; 62/78, 264

[56] References Cited

U.S. PATENT DOCUMENTS

,366,441 1/1968 Ellner .................................. 422/121
2,628,083 2/1953 Rense ................................... 62/264
2,902,834 9/1959 Bosworth ............................... 62/78

Primary Examiner—Bernard Nozick
Attorney, Agent, or Firm—Walter F. Wessendorf, Jr.

[57] ABSTRACT

A switch-controlled, ballasted, low-frequency, ultraviolet device mounted inline in an air-return system of an air-conditioning unit to resupply return air. The air-return system has an upstream filter and downstream cooling coil, drain pan and blower fan. The ultraviolet device is disposed inline between the filter and cooling coil, and in closest proximity to the cooling coil to maximize its effectiveness. Ultraviolet emissions, directed at the cooling coil and drain pan, destroy cooling-coil-and-drain-pan bacterial accumulations, growth of mold spores or slime, dust mites, airborne diseases, pollens and pollutants, and purify such return air.

3 Claims, 1 Drawing Sheet

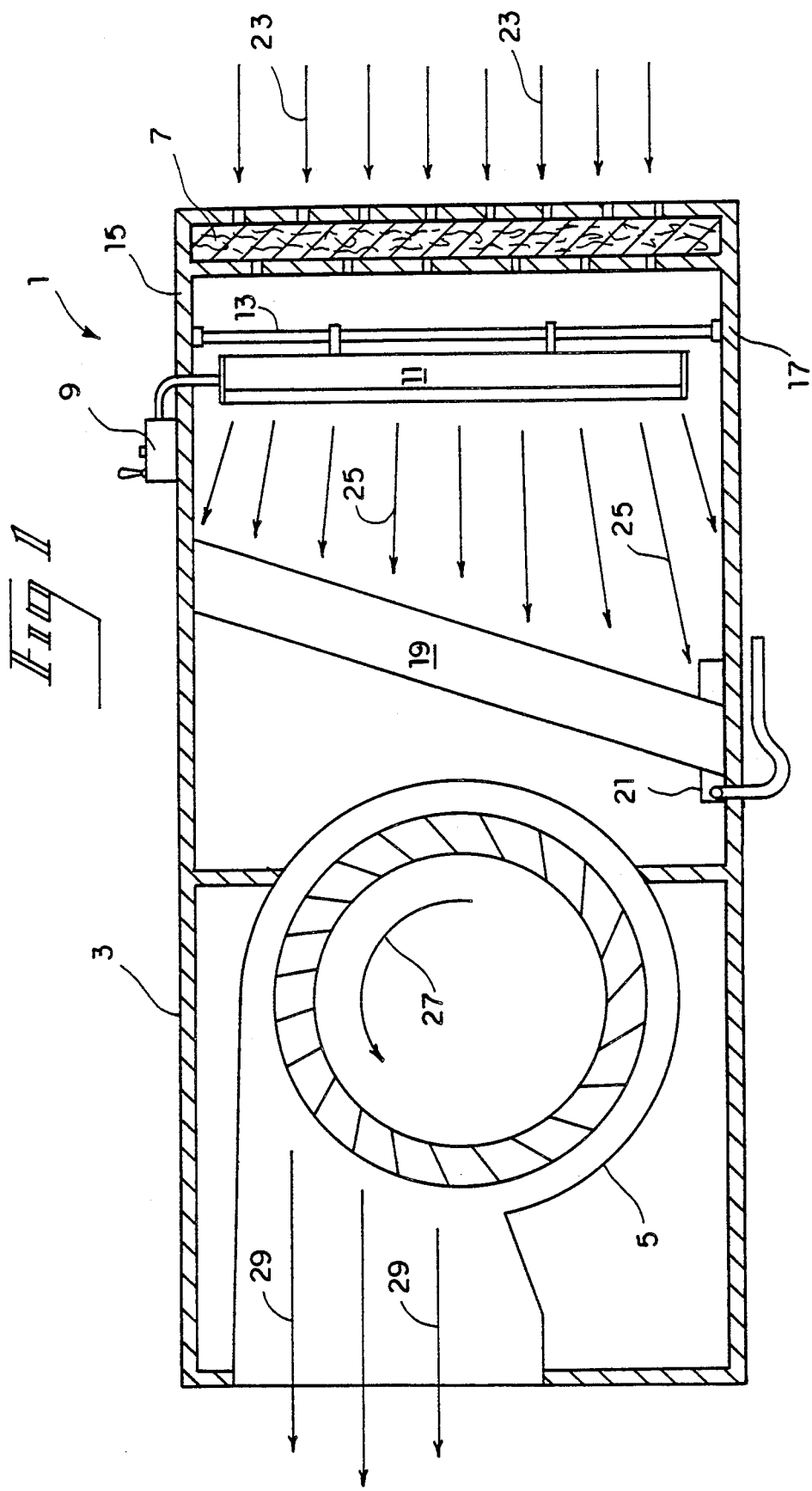

ULTRAVIOLET DEVICE

BACKGROUND OF THE INVENTION

1. Technical Field

This invention relates to a switch-controlled, ballasted, low-frequency, ultraviolet device adapted to be mounted, by means of a tension rod, inside the housing of the air return of an air-conditioning unit to retard, or otherwise destroy, the bacterial accumulations and growth of mold spores or slime on and around the wet cooling coil and drain pan of such air-conditioning unit, aggravated by continually recirculating air.

2. Background

Since early 1970, air-tight buildings especially, sometimes referred to as "sick buildings", have been constructed in the United States to prevent energy loss resulting from air leakage and which have resulted in the trapping therein of toxic chemical gases emitted building furnishings and consumer products, the trapping therein of other pollutants such as high levels of carbon monoxide, nitrogen oxides, environmental tobacco smoke, formaldehyde, carbon dioxide and varieties of airborne allergens and pathogens, and, last but not least, Legionella, commonly referred to as Legionnaire's disease, attributed to air-conditioning units, as causing some 5,000 to 7,000 deaths per year in the United States. Bacterial accumulation and slime around wet cooling coils and drain pans is a common condition, aggravated by continually recirculating air.

SUMMARY OF THE INVENTION

To contribute to the solution of and to help correct these problems discussed under the preceding "2. Background" under the heading "BACKGROUND OF THE INVENTION", the low-frequency ultraviolet device of this invention is adapted to be interposed inline and in closest proximity to the downstream wet cooling coil of an airconditioning unit with its emissions directed at the cooling coil to retard, or otherwise destroy, the bacterial accumulations and growth of mold spores or slime on and around the wet cooling coil and drain pan, which act as a dark, damp and natural incubator for mold spores, dust mites and airborne diseases, and, concomitantly, with the ultraviolet device operatively functioning to purify the return air as it circulates and recirculates through the airconditioning unit in order to eliminate to a great degree not only the viral-causing bacteria brought into the building by inhabitants, but also by air-return incubation, to thereby effectively control dust mites, mold spores, pollens and pollutants, and significantly reduce the incidence of respiratory infections, as well as illnesses perceived by building occupants as being building-related.

BRIEF DESCRIPTION OF THE DRAWING

These objects and other objects of the invention should be discerned and appreciated from the description of the preferred embodiment taken in conjunction with the drawing which depicts a sectional view of the return air system of an air-conditioning unit with its upstream filter, ultraviolet device interposed downstream between such filter and downstream cooling coil and drain pan, and downstream blower fan which draws therethrough and supplies return air.

DESCRIPTION OF THE PREFERRED EMBODIMENT

In the drawing figure, reference numeral 1 generally refers to the invention showing a housing 3 mounting a downstream blower fan 5 which draws upstream return air through an inline filter 7 to filter out and trap particles. Mounted on housing 3 is a switch-control box 9, electrically connected to a ballasted, low-frequency, ultraviolet device 11, to control such ultraviolet device 11. A tension rod 13, operatively engaged with the insides of the top wall 15 and bottom wall 17 of the housing 3, vertically disposes and mounts the ultraviolet device 11 in closest practicable proximity vis-a-vis a downstream cooling coil 19 and drain pan 21 to direct ultraviolet emissions at such cooling coil 19 and drain pan 21 to retard, or otherwise destroy, the bacterial accumulations and growth of mold spores or slime on and around such wet cooling, coil 19 and drain pan 21, as well as dust mites and airborne diseases from such return air, to purify the return air, to eliminate viral-causing bacteria, pollens and pollutants. The directional arrows 23 indicate the upstream air flow preparatory to its being drawn through the inline filter 7. The directional arrows 25 indicate the emissions from the ultraviolet device 11 directed at the cooling coil 19 and drain pan 21, and the dust mites and airborne diseases carried by the return air being drawn downstream by the blower fan 5. The directional arrow 27 indicates the directional rotation of the downstream blower fan 5. The directional arrows 29 indicate the downstream direction of the return air being resupplied.

I claim:

1. An ultraviolet device in combination with an air-return system of an air-conditioning unit to resupply return air; said air-return system comprising a housing member mounting inline an upstream filter, a downstream cooling coil and drain pan, and downstream blower fan, said blower fan drawing therethrough and resupplying said return air through said filter and cooling coil, said ultraviolet device being interposed inline between said filter and said cooling coil and drain pan with emissions from said ultraviolet device being directed to said cooling coil and drain pan to retard, or otherwise destroy, bacterial accumulations and growth of mold spores and slime on and around said cooling coil and drain pan, dust mites, airborne diseases, pollens and pollutants, and to purify said return air.

2. An ultraviolet device in accordance with claim 1, wherein said air-return system has a housing, wherein said housing has a top wall and a bottom wall, and wherein is further provided a rod, said rod being operatively engaged with said top and bottom walls, and said rod vertically disposing and mounting said ultraviolet device inline between said filter and cooling coil.

3. An ultraviolet device in accordance with claim 1, wherein said ultraviolet device is disposed and located in closest proximity to said cooling coil and drain pan to maximize its effectiveness.

* * * * *